United States Patent Office 3,258,995
Patented July 5, 1966

3,258,995
COMPOUND PLANETARY SPEED REDUCER
Raymur B. Bennett, Wayne, Maurice E. Cushman, Verona, and Tofa W. Khiralla, Caldwell Township, Essex County, N.J., assignors to Curtiss-Wright Corporation, a corporation of Delaware
Filed June 12, 1963, Ser. No. 287,360
3 Claims. (Cl. 74—801)

Our invention relates to rotary speed changers of the epicyclic variety having compound planetary members and relatively movable ring gears as component parts.

In the speed changer of the invention each of a plurality of planetary members has an intermediate portion in engagement with one internal ring gear and end portions in engagement with other internal ring gears such that tangential loads on the intermediate portions of the planetary members are balanced by reactions against the ring gears engaging the end portions of the planetary members. In this respect the speed changer of the invention resembles the "Planetary Speed Reducer and Power Actuated Hinge Device" of Patent No. 3,008,355, issued to D. Grudin on November 14, 1961 and the "Rotary Speed Changer" of Patent No. 2,944,444, issued to W. E. Burns on July 12, 1960. The device of the invention, however, features a simplified and improved arrangement permitting continuous rotation of input and output shafts.

The speed changer of the invention includes a pair of internal ring gears which are spaced along and secured to a fixed central shaft. A sun gear is rotatably mounted on the fixed shaft and a plurality of compound planetary members are provided between the sun gear and fixed ring gears. End portions of the planetary members coact with the fixed ring gears and an intermediate portion of each planetary member maintains driving engagement with the sun gear. The intermediate portion of each planetary member also maintains driving engagement with a rotatably mounted internal ring gear which is coaxial with the fixed ring gears. Either of two shafts, one of which connects through gearing with the sun gear and the other of which connects with the rotatably mounted ring gear may function as the input or output shaft of the device.

It is an object of the invention to provide a speed changer of the described type wherein axial movement of the planetary members is prevented in such manner that it is unnecessary to provide axially confining structures for these parts.

It is another object of the invention to provide such a speed changer wherein axial positions are defined for the sun gear and movable ring gear by the tooth geometries on these parts and the engaging portions of the planetary members.

It is still another object of the invention to provide such a speed changer wherein the planetary members, sun gear and movable ring gear are axially loaded equally in opposite directions during operation of the device such that it is unnecessary to provide thrust bearings for these parts.

It is a further object of the invention to provide an improved speed changer which is light in weight, has few parts, and operates more smoothly and quietly than other such devices heretofore known in the art.

Other objects and advantages of the invention will become apparent during a reading of the specification taken in connection with the accompanying drawings in which:

FIGURE 3 is a plan view of one of the planetary members of the speed changer.

Figure 1:
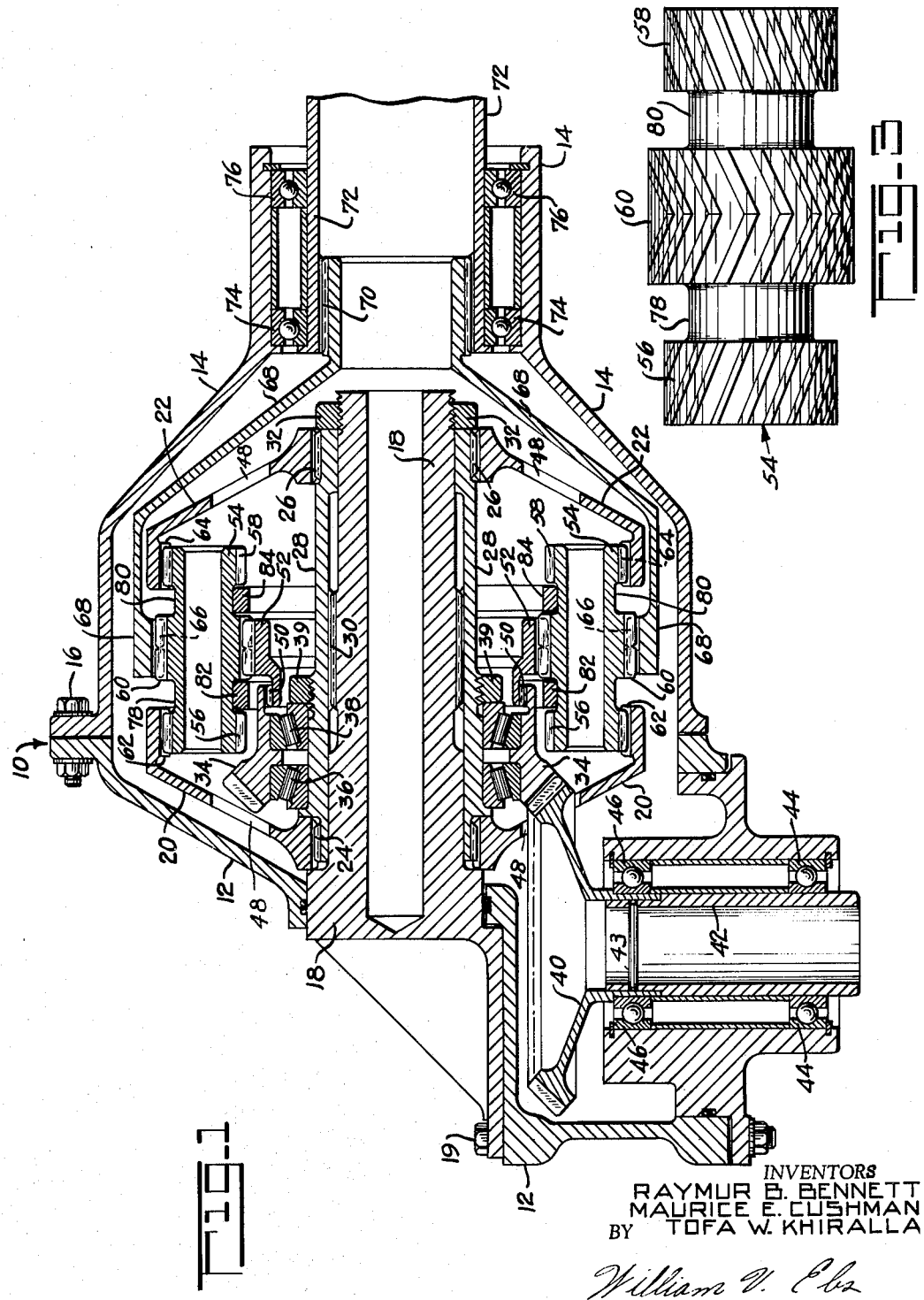
FIGURE 1 is a vertical longitudinal section taken through the speed changer of the invention.
Figure 2:
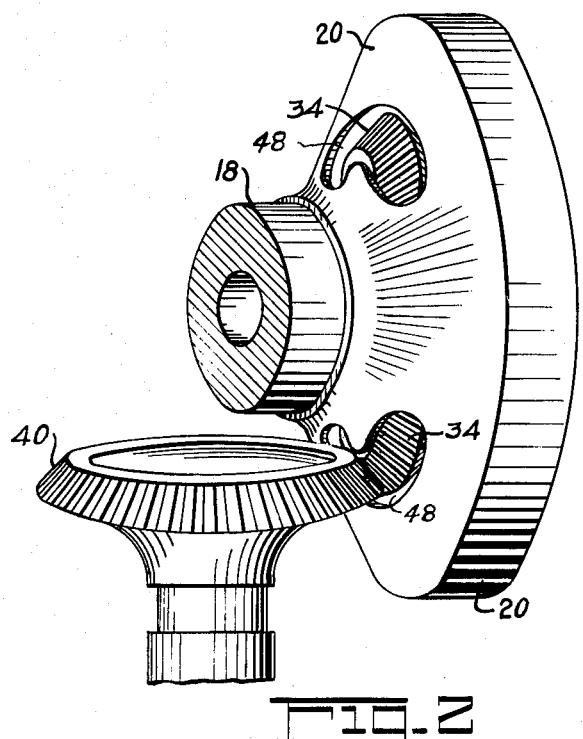
FIGURE 2 is a perspective view showing a portion of the device.

Referring to the drawing, reference character 10 designates a housing which comprises portions 12 and 14 that are bolted together at their peripheries as at 16. Housing portion 12 has a fixed shaft 18 secured thereto as at 19. Spaced along the shaft 18 are a pair of ring gears 20 and 22 which are spline connected at 24 and 26 respectively to a sleeve 28. The sleeve 28 is spline connected to the shaft 18 at 30 and is secured in a fixed axial position by means of the nut 32 which has a threaded connection with the shaft. Ring gears 20 and 22 are not only held against rotation, but are also prevented from moving axially along the shaft 18. As shown, ring gear 20 is secured between the shaft 18 and sleeve 28, and the ring gear 22 is secured between the nut 32 and sleeve 28. A bevel gear 34 is rotatably mounted on sleeve 28 by means of bearings 36 and 38 which are designed to support both radial and axial loads. Such bearings which are secured upon sleeve 28 by the nut 39 maintain bevel gear 34 in a fixed axial position relative to shaft 18.

Bevel gear 34 meshes with a bevel gear 40 that is secured by pin 43 to a shaft 42 which is rotatably mounted on bearings 44 and 46 in housing portion 12. As shown, gear 40 projects through one of a plurality of openings 48 in ring gear 20 to mesh with bevel gear 34. For reasons which will become apparent hereinafter ring gears 20 and 22 are so constructed that they have the same stiffness characteristics. This is preferably obtained by providing the ring gear 22 with openings 48 identical to those in ring gear 20 and having ring gear 22 like ring gear 20 in all other respects as well.

Bevel gear 34 connects through splines at 50 with a sun gear 52 which engages each of a plurality of compound planetary members 54. These compound planetary members 54 include end toothed portions 56 and 58 and an intermediate toothed portion 60. The sun gear 52 engages the intermediate toothed portions 60 of the planetary members and the end toothed portions 56 and 58 of the planetaries engage internal toothed portions 62 and 64 respectively of the fixed ring gears 20 and 22. The intermediate toothed portions 60 of the planetary members, not only engage the sun gear 52 but also engage an internal toothed portion 66 of a ring gear 68 which connects at splines 70 with a shaft 72 that is rotatably mounted on bearings 74 and 76 in housing portion 14.

The end toothed portions 56 and 58 of the planetary members, and the internal toothed portions 62 and 64 of the fixed ring gears have helical gear teeth so formed that the helical teeth of portions 56 and 62 in mesh at one end of each of the planetary members are of opposite hand from the helical teeth of portions 58 and 64 in mesh at the opposite end of each of said planetary members. Intermediate toothed portions 60 of each planetary member, the engaging internal toothed portion 66 of ring gear 68, and the sun gear 52 also in engagement with toothed portions 60 are formed with herringbone gear teeth comprising side-by-side helical portions in each of which the teeth are of the same hand and slope at the same angle as teeth of the nearest end toothed portion of the planetary member and engaging fixed ring gear.

The speed change ratio of the overall assembly may be readily established by the application of conventional compound planetary gearing design techniques. In any design, however, the internal toothed portions 62 and 64 of the fixed ring gears should have the same number of teeth which may differ as desired from the number of teeth in the internal toothed portion 66 of movable ring gear 68. End toothed portions 56 and 58 of the planetary members should also have equal numbers of teeth which may correspond or differ from the number of herringbone gear teeth in the intermediate toothed portion 60. Between end portions 56 and 58 of the planetary members, cylindrical annular portions 78 and 80 are formed either reduced in diameter relative to the toothed portions of the planetary members, as shown, or somewhat larger in diameter whereby the beam strength of the planetary members may be increased. Preferably the annular portions are no greater in diameter than the root diameter of any of the toothed portions on the planetary members, and the toothed portions thereon all have the same number of teeth arranged to permit cutting equipment to pass from either end of a planetary member to the mid line dividing the helical portions of the herringbone gear teeth without interruption. Rings 82 and 84 concentric with the axis of shaft 18 engage the annular portions 78 and 80, and serve to hold the planetary members outwardly in mesh with the several ring gears.

When shaft 42 is rotated, bevel gears 40 and 34 are caused to rotate and drive the sun gear 52 which in turn drives the planetary members 54. The end toothed portions 56 and 58 of the planetary members react against the internal toothed portions 62 and 64 respectively of the fixed ring gears while the intermediate toothed portions 60 of the planetary members react against the internal toothed portion 66 of ring gear 68 to thereby impart rotation to the ring gear 68 and shaft 72. The planetary members 54 rotate about their own axes as well as revolve about the axis of shaft 18. At the same time the rings 82 and 84 which maintain rolling contact with annular portions 78 and 80 respectively of the planetary members roll about the axis of shaft 18. The rings 82 and 84 serve a particularly useful purpose where the device is subject to operation at other than a constant predeterminable speed in that they will oppose separating forces acting between the teeth of the ring gears and engaging teeth of the planetary members to maintain the toothed portions of the planetary members and ring gears firmly in mesh regardless of the speed of revolution of the planetary members. Where the device is to be run at a constant speed, the parts may be so proportioned that at design speed, the planetary members will generate sufficient centrifugal force for this purpose such that rings need not be provided.

Axially directed force components resulting from the interaction of the helical gear teeth on the planetary members with the helical teeth on the ring gears, act upon the planetary members during operation of the device. Such force components, however, cancel one another. The axial force components on each of the planetary members due to the interaction of respective end toothed portions with the toothed portions of the fixed ring gears are cancelling in their effect as are the axial force components on each of the planetary members due to the interaction of the respective portions of the herringbone gear teeth thereon with meshing gear teeth of the movable ring gear and sun gear. The fixed ring gears are loaded axially in opposite directions to an equal extent and since these gears have the same stiffness characteristics they can deflect axially only equally in opposite directions. There is, therefore, no tendency for the planetary members to move axially. Obviously, it is unnecessary to provide thrust bearings for the planetary members or to confine these parts axially in any way. The fixed ring gears are loaded tangetially as well as axially during operation of the speed changer, but each to the same extent as to the other and in the same direction such that meshing gear teeth on the planetary members and ring gears remain aligned whereby uneven wear on the teeth and uneven operation are avoided. Axial positions are defined for the movable ring gear 68 and sun gear 52 by the geometry of the gear teeth on these parts and of the meshing gear teeth on the planetary members. Axial forces exerted on the movable ring gear and sun gear act in equal degree in opposite directions such that no net resultant force is exerted on either part. There is no need for axially confining structures or thrust bearings for either gear.

Of course, either of the shafts 42 or 72 may serve as the input shaft of the speed changer in which event the other shaft becomes the output shaft. When shaft 42 is the input shaft, the device functions as described hereinabove and the output speed of shaft 72 is much less than the speed of shaft 42. If power is applied to turn shaft 72, the device functions in a generally similar manner and shaft 42, which then becomes the output shaft, is caused to turn at a much faster rate than shaft 72.

While only one form of the invention has been shown, it will be apparent to those skilled in the art that various changes and modifications may be made in the structure shown and described without departing from the spirit and scope of the invention as set out in the appended claims.

What is claimed is:

1. A speed changer comprising a fixed shaft; a pair of coaxial internally toothed substantially identical ring gears having corresponding openings in their end faces, said ring gears being spaced along and secured on the fixed shaft; a plurality of compound planetary members, each having one toothed portion in engagement with the toothed portion of one of the pair of internal ring gears and having a second toothed portion in engagement with the toothed portion of the other of said pair of internal ring gears, each of said planetary members also including a third toothed portion between the other toothed portions thereon; a third ring gear coaxial with said pair of ring gears and having an internal toothed portion in engagement with the said third toothed portion on each planetary member; an output shaft; a driving connection between the output shaft and said third ring gear; a sun gear coaxial with the ring gears, rotatable about the axis of said fixed shaft and in engagement with the third toothed portion of each planetary member; an input shaft; and a driving connection extending from said input shaft and through an opening in one of the said pair of ring gears to the sun gear.

2. The speed changer of claim 1 wherein the driving connection extending between the input shaft and sun gear includes a pair of bevel gears, one of which extends into the said opening in one of the said pair of ring gears to mesh with the other bevel gear.

3. The speed changer of claim 1 wherein said one and the second toothed portion of each planetary member are formed with opposite hand helical gear teeth and respective gears of said pair of internally toothed ring gears are also formed with opposite hand helical gear teeth to mesh with the said one and second toothed portions of the planetary members; the toothed portion of said third ring gear, the third toothed portion of each planetary member, and the sun gear have herringbone gear teeth; the driving connection between the output shaft and the third ring gear is adapted to enable the output shaft to move axially without imparting axial movement to said third ring gear, and the driving connection between the input shaft and sun gear is adapted to enable the input shaft to move axially without imparting axial movement to the sun gear.

References Cited by the Examiner

UNITED STATES PATENTS

| | | | |
|---|---|---|---|
| 137,267 | 3/1873 | Webster et al. | 74—801 |
| 1,323,245 | 12/1919 | Borkes | 74—801 |
| 1,504,792 | 8/1924 | Smith | 74—410 |
| 2,487,952 | 11/1949 | Sznycer | 74—801 |
| 2,703,021 | 3/1955 | Stoeckicht | 74—801 |
| 2,944,444 | 7/1960 | Burns | 74—801 |

FOREIGN PATENTS

| | | |
|---|---|---|
| 162,781 | 5/1955 | Australia. |
| 938,913 | 4/1948 | France. |
| 999,235 | 10/1951 | France. |
| 27,776 | 11/1909 | Sweden. |

DAVID J. WILLIAMOWSKY, *Primary Examiner.*

DON A. WAITE, *Examiner.*

T. C. PERRY, *Assistant Examiner.*